(12) United States Patent
Sakai (10) Patent No.: US 6,873,591 B2
(45) Date of Patent: Mar. 29, 2005

(54) TWO-WAVELENGTH OPTICAL PICKUP DEVICE WITH STEP-LIKE DIFFRACTION ELEMENT

(75) Inventor: Hiroshi Sakai, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 391 days.

(21) Appl. No.: 10/067,686

(22) Filed: Feb. 4, 2002

(65) Prior Publication Data

US 2002/0114257 A1 Aug. 22, 2002

(30) Foreign Application Priority Data

Feb. 14, 2001 (JP) ........................................ 2001-036619

(51) Int. Cl.[7] .............................................. G11B 7/135
(52) U.S. Cl. ................................................ 369/112.12
(58) Field of Search ...................... 369/112.12, 112.07, 369/121, 112.03, 112.24

(56) References Cited

U.S. PATENT DOCUMENTS 5,400,311 A * 3/1995 Komma et al. .......... 369/112.1
6,084,843 A * 7/2000 Abe et al. ............... 369/112.07
6,414,930 B1 * 7/2002 Shiono et al. .......... 369/112.03
6,449,237 B1 * 9/2002 Yoo et al. ............... 369/112.05
6,545,821 B2 * 4/2003 Katsuma ..................... 359/721

* cited by examiner

Primary Examiner—William Klimowicz
Assistant Examiner—Peter Vincent Agustin
(74) Attorney, Agent, or Firm—Hogan & Hartson, LLP (57) ABSTRACT

An optical pickup device is equipped with a first light source that emits first light, a second light source that emits second light having a wavelength different from a wavelength of the first light, and a diffraction element that deflects the first light or the second light to match optical axes of the lights. The diffraction element is a step-like diffraction element in which one of an incident face and an emitting face thereof has a step-like grating face. A step difference of the step-like grating face is set to have a measurement that generates a phase difference of one wavelength of one of the first light and the second light, and the number of steps of the step-like grating face is set to maximize a (+) first order diffraction efficiency or a (−) first order diffraction efficiency for the other light.

8 Claims, 10 Drawing Sheets

Total Depth of 3-step Phase Diffraction Element (unit: $\lambda_1$=635nm)

TWO-WAVELENGTH OPTICAL PICKUP DEVICE WITH STEP-LIKE DIFFRACTION ELEMENT

BACKGROUND OF THE INVENTION

1. Field of the Invention

The present invention relates to a two-wavelength optical pickup device that is used for recording and reproducing data on optical recording media such as CDs (compact discs), DVDs (digital versatile discs) and the like. More particularly, the present invention relates to a step-like diffraction element that is used for matching optical axes of two lights having different wavelengths that are emitted from light sources located at different emission points in the two-wavelength optical pickup device, and a method for designing such a step-like diffraction element.

2. Description of Related Art

CDs and DVDs, which are mutually different in their substrate thickness and recording density, are known as optical recording media. When recording or reproduction of data is conducted with respect to those optical recording media, laser beams of different wavelengths may be required. For example, while a laser beam with a wavelength of 650 nm is required to reproduce data on a DVD, a laser beam with a wavelength of 780 nm is required to reproduce and record data on a CD-R.

A so-called two-wavelength optical pickup device is known as an optical pickup device that reads DVDs and reads and records on CD-Rs. The two-wavelength optical pickup device has a laser beam light source for emitting a laser beam with a wavelength of 650 nm and a laser beam light source for emitting a laser beam with a wavelength of 780 nm mounted as a single light source.

For example, a conventional two-wavelength optical pickup device uses a common optical system for different laser beams in order to make the device smaller and more compact. For this purpose, one of the laser beams that are emitted from laser beam light sources at different emission points is deflected by a diffraction grating to thereby conduct both of the laser beams into a common optical path, and converge them on an optical recording medium through a common objective lens.

The diffraction grating, which is used as a phase diffraction element, is formed from a transparent substrate in which one of its opposing incident face and emission face has a grating surface provided with gratings having protrusions and grooves. The depth of the grating is set such that the diffraction grating phase is $2\pi$, in other words, is set at a light-path difference corresponding to one wavelength, for the laser beam from the laser beam light source with a shorter wavelength. Accordingly, the laser beam from the laser beam light source with the shorter wavelength travels straight path without being affected by the diffraction action, and the laser beam from the laser beam light source with the longer wavelength receives the diffraction action, and its first-order diffraction light obtained by the diffraction is introduced in the common optical path.

When the wavelength of the laser beam light source with the shorter wavelength that does not receive the diffraction action is 650 nm, and the wavelength of the laser beam light source with the longer wavelength that receives the diffraction action is 780 nm, and when the refractive index of the grating material is N and the depth of the grating groove is d, the diffraction grating is composed in a manner to satisfy $N \times d = 650$ nm.

In the mean time, a phase difference with respect to the beam of a wavelength 780 is given by the following expression (1).

$$N \times d/780 \times 2 \times \pi = 0.833 \times 2\pi \quad (1)$$

Also the diffraction efficiency of (±) first order diffraction light with a wavelength of 780 nm is given by the following expression (2).

$$(2/\pi)^2 \times \sin^2(0.833 \times 2\pi/2) = 0.10 \quad (2)$$

It is understood from the above that the conventional two-wavelength optical pickup device has a small utilization efficiency of 0.1 for the laser beam with a wavelength of 780 nm that is diffracted by the diffraction grating, in other words, by a phase diffraction element. Therefore, in order to perform recording on CD-Rs, a laser beam light source that is capable of emitting a light amount ten times greater than the ordinary amount required. In order to prevent the light diffraction efficiency from lowering, a step-like diffraction element in which its grating is configured in a step-like manner needs to be used as a phase diffraction element.

Also, when the light amount is modulated, the wavelength of a semiconductor laser that is used as a light source varies by several nm depending on the light amount. As a result, the diffraction angle changes due to the changes in the wavelength, which causes a deviation in the optical axis. A deviation angle $\Delta\theta$ of the optical axis is given by the following formula (3).

$$\Delta\theta = \sin^{-1}(\Delta\lambda/P) \quad (3)$$

where, $\Delta\lambda$ is an amount of the change in the wavelength at the time of reproducing and recording data, and P is a grating interval.

Occurrence of deviations in the optical axis at the time of recording is not appreciated because this may cause problems such as tracking deviations or deformations in pit configurations.

On the other hand, the optical system that uses two wavelengths suffers chromatic aberrations in which, for example, focal distances of the objective lens and the collimator lens become different depending on the wavelengths. For this reason, the position of light advancing direction of a light emission point of each light source must be decided according to the chromatic aberration of the collimator lens. Therefore, the design of a two-wavelength light source is dependent on the design of a collimator lens and therefore hardly has any degree of freedom.

SUMMARY OF THE INVENTION

In view of the problems described above, it is an object of the present invention to provide an optical pickup device equipped with a step-like diffraction element that can conduct lights with different wavelengths emitted from multiple light sources into a common optical system with good diffraction efficiency.

An optical pickup device in accordance with one embodiment of the present invention comprises a first light source that emits first light, a second light source that emits second light having a wavelength different from a wavelength of the first light, and a diffraction element that deflects the first light or the second light to match optical axes of the first and second lights. The diffraction element is a step-like diffraction element in which one of an incident face and an emitting face thereof has a step-like grating face, and a step difference of the step-like grating face is set to have a measurement that generates a phase difference corresponding to one wavelength of one of the first light and the second light, and the number of steps of the step-like grating face is set such that the number of steps maximizes a (+) first order diffraction efficiency or a (−) first order diffraction efficiency for the other light.

When the wavelength λ1 of the first light is longer than the wavelength λ2 of the second light, in other words, when the first light is on the longer wavelength side, and the second light is on the shorter wavelength side, and the step difference of the step-like grating face is set to have a measurement that generates a phase difference of one wavelength for the first light, the first light on the longer wavelength side travels straight path through the diffraction element without receiving a diffraction action by the step-like diffraction element.

In this case, when the number of steps of the step-like grating face of the step-like diffraction element may be set to be an integer that is closest to a value α that satisfies an expression, λ 2/λ 1=α/(α+1), the diffraction efficiency of the (−) first order diffraction light of the second light on the shorter wavelength side is improved. Accordingly, the (−) first order diffraction light may be used as a light to be emitted from the second light source.

Conversely, when the step difference of the step-like grating face of the step-like diffraction element is set to have a measurement that generates a phase difference corresponding to one wavelength for the second light, the second light on the shorter wavelength side travels straight path through the diffraction element without receiving a diffraction action by the step-like diffraction element.

In this case, when the number of steps of the step-like grating face may be set at a value in which one "1" is added to an integer that is closest to a value α that satisfies λ 2/λ 1=α/(α+1), the diffraction efficiency of the (+) first order diffraction light on the longer wavelength side is improved. Accordingly, the (+) first order diffraction light may be used as a light to be emitted from the first light source.

Other objects, features and advantages of the invention will become apparent from the following detailed description taken in conjunction with the accompanying drawings.

PREFERRED EMBODIMENTS OF THE INVENTION

Optical pickup devices in accordance with various embodiments of the present invention are described below with reference to the accompanying drawings.

(First Embodiment)

Figure 1:
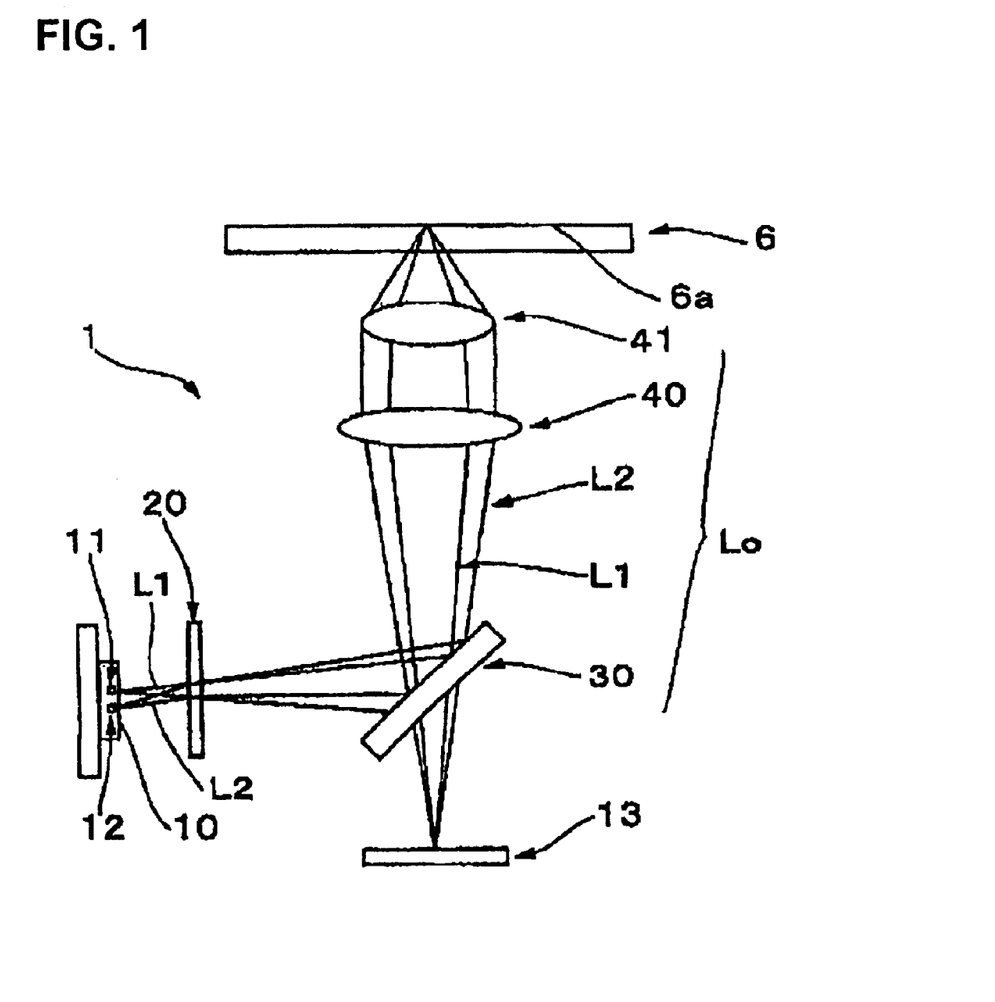
FIG. 1 schematically shows a structure of an optical system of an optical pickup device in accordance with a first embodiment of the present embodiment.

FIG. 1 schematically shows a structure of an optical system of an optical pickup device 1 in accordance with a first embodiment of the present invention. The optical pickup device 1 of the present embodiment reproduces and records data on optical recording media 6 of different types that are different in the substrate thickness and the recording density, such as CDs, CD-Rs and DVDs. The optical pickup device 1 is equipped with a two-wavelength light source (light source unit) 10 that may include as a single common package a first laser beam light source 11 that emits a first laser beam L1 with a wavelength of 785 nm and a second laser beam light source 12 that emits a second laser beam L2 with a wavelength of 650 nm, and a common optical system Lo. Light emitting positions of the first laser beam L1 and the second laser beam L2 are separated from one another by a specified distance.

The common optical system Lo includes a step-like diffraction element 20 that straightly advances the first laser beam L1 emitted from the two-wavelength light source 10 and deflects the second laser beam L2 emitted from the two-wavelength light source 10 to match optical axes of both of the beams, a plate-shaped beam splitter 30 that partially reflects the laser beams L1 and L2 whose optical axes coincide with one another, a collimator lens 40 that forms parallel light of the laser beams L1 and L2 that has been reflected by the beam splitter 30, and an objective lens 41 that converges the laser beams L1 and L2 emitted from the collimator lens 40 on a recording surface 6a of the optical recording medium 6. The step-like diffraction element 20 will be described below in greater detail.

Also, a common light-receiving element 13 is disposed in the common optical system Lo to receive returning lights of the first laser beam L1 and the second laser beam L2 that pass the beam splitter 30 after having been reflected by the recording face 6a of the optical recording medium 6.

With the optical pickup device 1 having the structure described above, the first laser beam L1 with a wavelength of 785 nm is emitted from the first laser beam light source 11 when recording data on a CD-R as the optical recording medium 6. The first laser beam L1 is conducted to the common optical system Lo through the step-like diffraction element 20, and converged as a light spot on the recording face of the CD-R by the objective lens 41 whereby the data is recorded.

In contrast, the second laser beam L2 with a wavelength of 650 nm is emitted from the second laser beam light source 12 when reproducing data on a DVD as the optical recording medium 6. The second laser beam L2 is also conducted to the common optical system Lo through the step-like diffraction element 20, and converged as a light spot on the recording face of the DVD by the objective lens 41; and returning light of the second laser beam L2 reflected on the recording face of the DVD is condensed on the common light receiving element 13 through the beam splitter 30. Data on the DVD is reproduced based on the signals detected by the common light-receiving element 13.

(Step-Like Diffraction Element)

Description will be made with respect to the step-like diffraction element 20 that straightly advances the first laser beam L1 with a long wavelength of 785 nm emitted from the two-wavelength light source 10 and deflects the second laser beam L2 with a short wavelength of 650nm to match the optical axes of the two laser beams.

Figure 2:
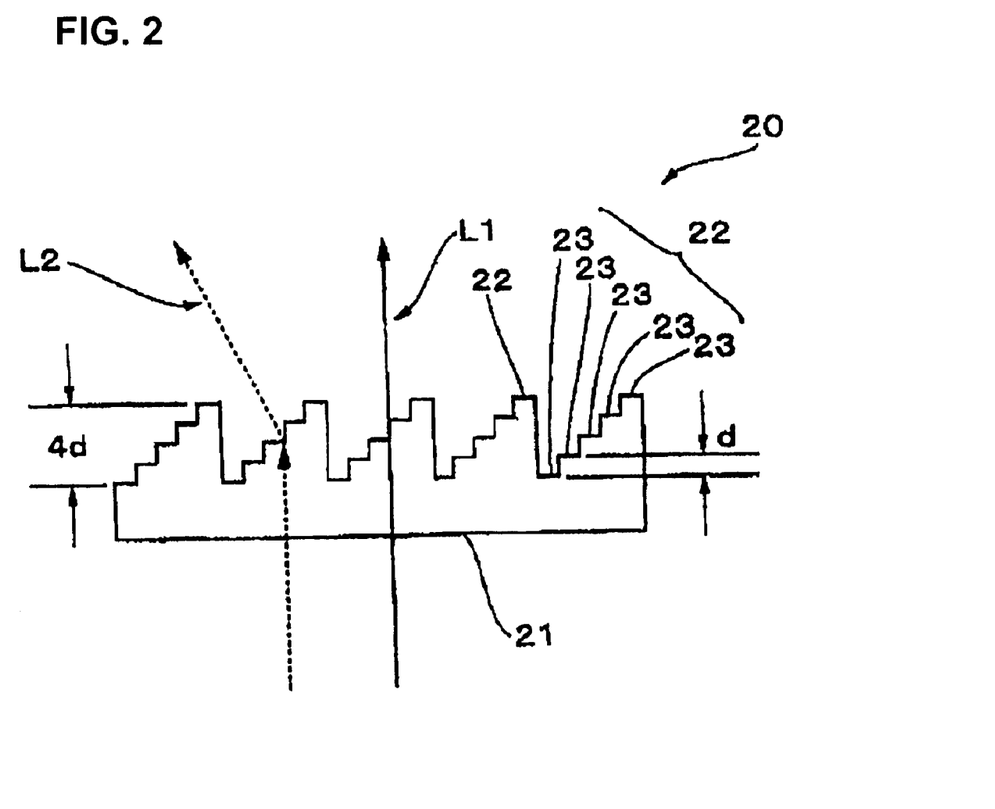
FIG. 2 is a cross-sectional view of a step-like diffraction element to be used in the optical pickup device 1 shown in FIG. 1.
Figure 3:
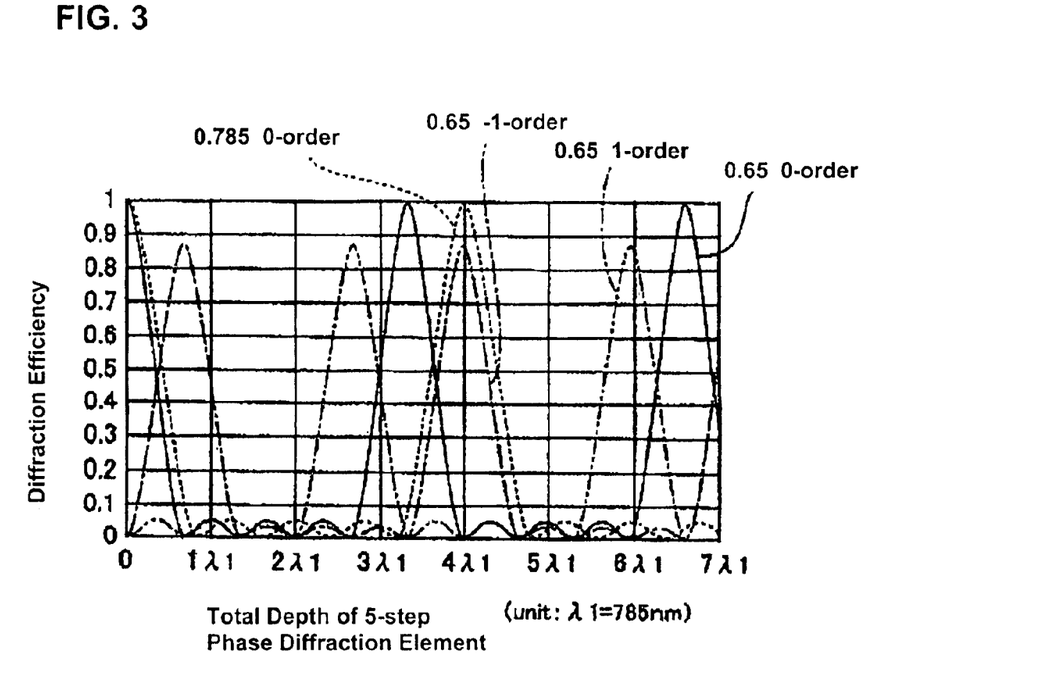
FIG. 3 is a graph showing relations between grating depths of the step-like diffraction element shown in FIG. 2 and diffraction efficiency.

FIG. 2 is a cross-sectional view of a step-like diffraction element to be used in the optical pickup device 1 shown in FIG. 1. FIG. 3 is a graph showing relations between grating depths of the step-like diffraction element shown in FIG. 2 and the diffraction efficiency.

The step-like diffraction element 20 of the present embodiment is formed from a flat plate that is transparent to the wavelengths used, in which one of the faces defines a flat incident face 21 and the other face defines an emission face 22 having a step-like grating surface. The step-like grating surface has periodically formed step-like gratings or stair-like gratings, each of which is composed of a plurality of step faces 23. In this embodiment, the number of step faces 23 is five.

A step difference d between adjacent ones of the step faces 23 of the step-like grating in the direction of an optical axis is set to have a measurement that generates a phase difference of $2\pi$, in other words a light-path difference corresponding to one wavelength when the first laser beam L1 with a long wavelength of 785 nm transmits the grating. Accordingly, the step-like diffraction element 20 straightly advances the first laser beam L1 and deflects the second laser beam L2.

The number of steps of the step-like grating is determined to be "5" in the following manner. When the wavelength of the first laser beam on the long wavelength side is $\lambda 1$, and the wavelength of the second laser beam on the short wavelength side is $\lambda 2$, the number of steps is set to be an integer that is closest to $\alpha$ that satisfies the following expression (4).

$$\lambda 2/\lambda 1 = \alpha/(\alpha+1) \tag{4}$$

In the present embodiment, the long wavelength $\lambda 1$ is 785 nm, and the short wavelength $\lambda 2$ is 650 nm. With these values substituted in the expression (4), the following expression (5) is obtained.

$$\lambda 2/\lambda 1 = 650/785 = 0.828 \ldots = \alpha/(\alpha+1) \tag{5}$$

Therefore, the value $\alpha = 4.813 \ldots$, and an integer that is closest to the value $\alpha$, which is "5", is obtained.

The diffraction efficiency of the step-like diffraction element 20 with the five step faces 23 may be given by the following expressions (6) and (7), when the zero-order diffraction efficiency is Fo and M order diffraction efficiency is Fm.

$$Fo = 1/5^2 \{2 \cos(2d\pi) + 2 \cos(2d\pi/2) + 1\}^2 \tag{6}$$

$$Fm = 1/(\pi m)^2 [\sin\{\pi(2dm)\} - \sin\{\pi(2d+3/5m)\} + \sin\{\pi(d+3/5m)\} - \sin\{\pi(d+1/5m)\} + \sin(1/5\pi m)]^2 \tag{7}$$

In these expressions, d is a height of one step between adjacent ones of the step faces 23, and m is an order number of diffraction (which is an integer, but m≠0). Relations between the grating depths and the diffraction efficiency with the long wavelength $\lambda 1 = 785$ nm and the short wavelength $\lambda 2 = 650$ nm, which are derived from the expressions (6) and (7) are shown in a graph in FIG. 3. The grating depths are expressed by multiples of $\lambda 1$ that represents the long wavelength of 785 nm.

As shown in the figure, when the total depth of the five step faces 23, in other words, the value of 4d, is changed from zero (0) to $7\lambda 1$, no phase difference occurs for the long wavelength $\lambda 1 = 785$ nm at $4\lambda 1$ because the step difference d corresponds to one wavelength, and the zero-order diffraction efficiency becomes to be "1", and the (−) first-order diffraction efficiency for the short wavelength $\lambda 2 = 650$ nm becomes to be 0.86, in other words, both of the diffraction efficiencies reach their respective maximum values.

Accordingly, the number of steps obtained by the expression (4), which is 5, maximizes the zero-order diffraction efficiency of the long wavelength $\lambda 1 = 785$ nm and the (−) first-order diffraction efficiency of the short wavelength $\lambda 2 = 650$ nm.

In contrast, when the step-like diffraction element 20 is formed in the number of steps that does not satisfy the expression (4), in other words, in the number of steps other than 5, the zero-order diffraction efficiency of the long wavelength and the (+) first-order diffraction efficiency or the (−) first-order diffraction efficiency of the short wavelength cannot be maximized.

In this embodiment, the collimator lens 40 generally satisfies the sine condition: and therefore, when an image height is h, and the focal position of the long wavelength 785 nm of the collimator lens 40 is $F_{765}$, a focal position $\Delta Z$ in the optical axis direction is given by the following expression (8).

$$\Delta Z \cong F_{785} - \sqrt{(F_{785}^2 - h^2)} \tag{8}$$

When a refractive index of the collimator lens 40 that is manufactured with a material having a single uniform refractive index against the laser beam with a short wavelength of 650 nm is $N_{650}$, and a refractive index of the collimator lens 40 against the laser beam with a long wavelength of 785 nm is $N_{785}$, the amount of chromatic aberration $\Delta Fc$ can be given by the following expression (9)

$$\Delta Fc = F_{785} - F_{785} N_{650}/N_{785} \tag{9}$$

A focus deviation $\Delta F$, which is caused by a positional difference (a height) in a vertical direction with respect to the optical axis of the laser beams emitted from the two different laser beam light sources can be given by adding the expressions (8) and (9) as indicated in an expression (10) as follows.

$$\Delta F = \Delta Z + \Delta Fc \cong F_{785} - \sqrt{(F_{785}^2 - h^2)} + F_{785} - F_{785} N_{650}/N_{785} \tag{10}$$

Figure 4:
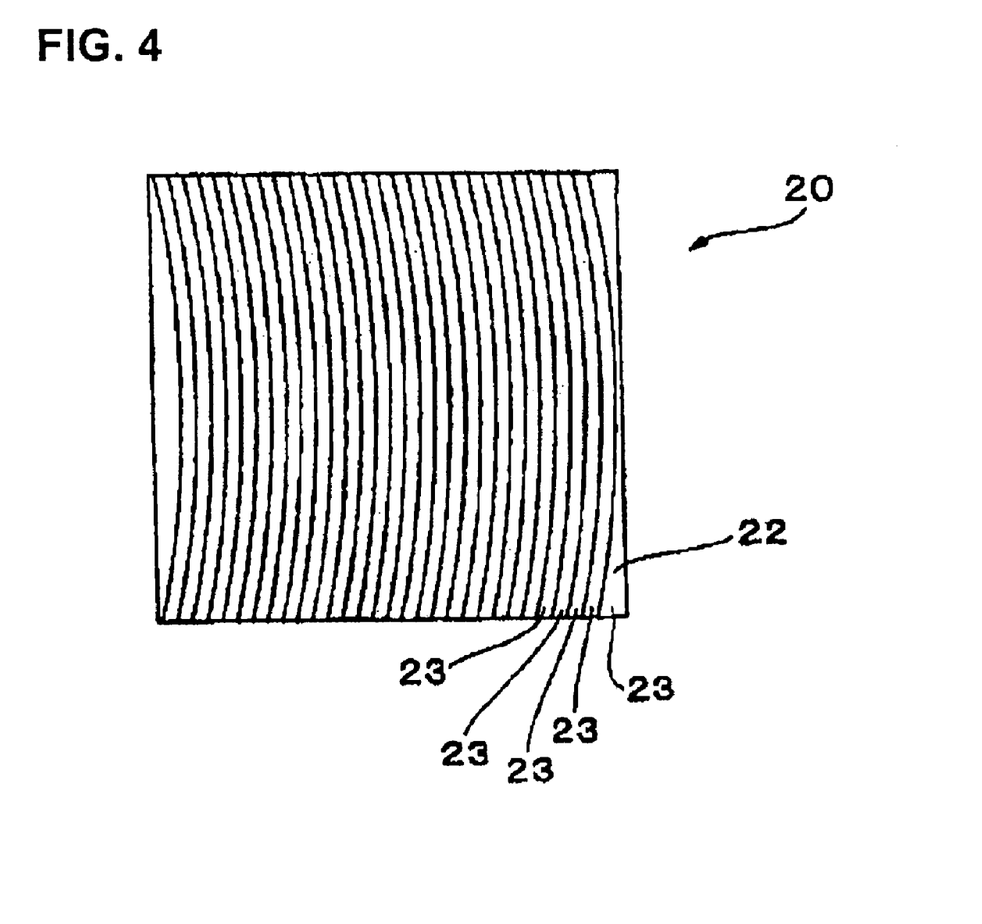
FIG. 4 is a plan view of gratings of the step-like diffraction element shown in FIG. 2.

The focus deviation $\Delta F$ can be corrected by forming the step-like step surfaces 23 on the emitting face 22 of the step-like diffraction element 20 in concentric curves, as indicated in FIG. 4.

In the optical pickup device 1 in accordance with the present embodiment, the step-like diffraction element 20 is used to match the optical axes of the laser beams L1 and L2 having different wavelengths, and the number of steps of the step faces 23 of the step-like diffraction element 20 is set such that the (−) first order diffraction efficiency of the laser beam L2 that receives the diffraction action is maximized. Accordingly, the utilization efficiency of both of the lights emitted from the first and second laser beam light sources 11 and 12.

(Second Embodiment)

Figure 5:
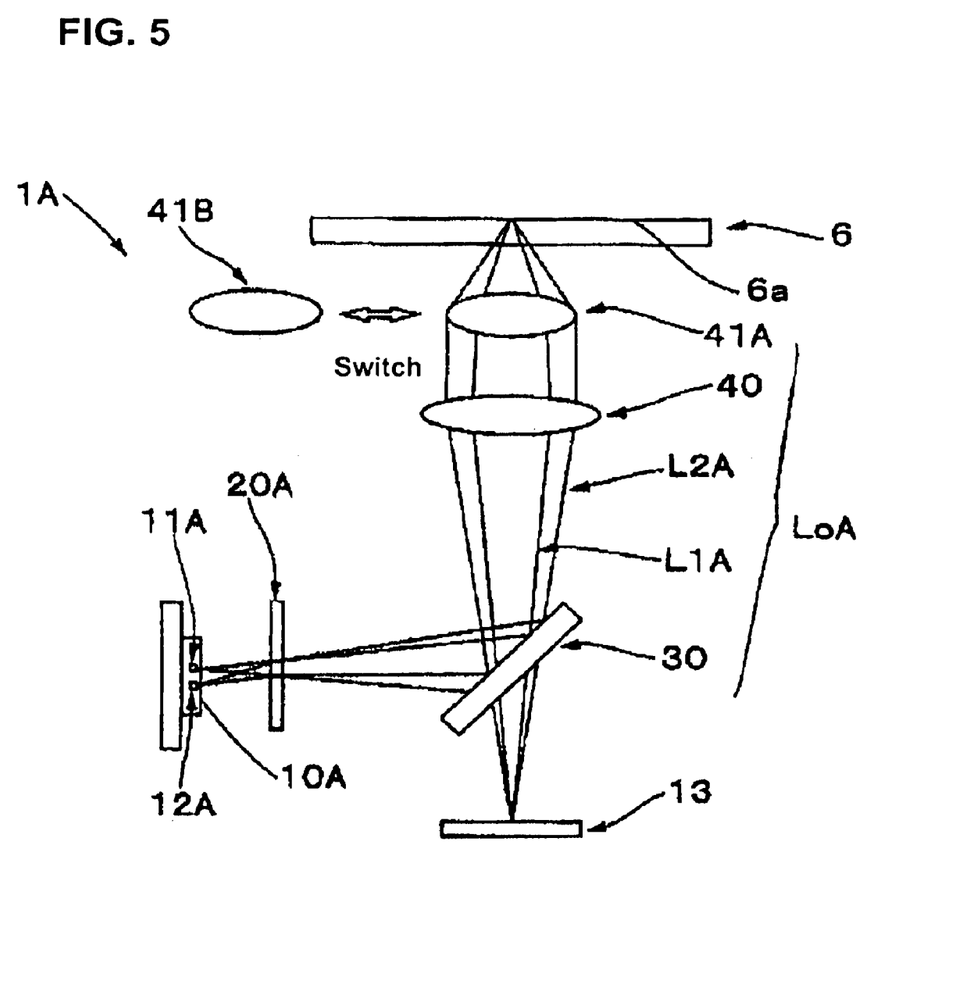
FIG. 5 schematically shows a structure of an optical system of an optical pickup device in accordance with a second embodiment of the present invention.

FIG. 5 schematically shows a structure of an optical system of an optical pickup device 1A in accordance with a second embodiment of the present invention. The optical pickup device 1A of the second embodiment has a structure similar to that of the first embodiment, and accordingly descriptions of elements common to both of the embodiments are omitted.

The optical pickup device 1A is equipped with a two-wavelength light source (light source unit) 10A that may include as a common package a first laser beam light source 11A that emits a first laser beam L1A with a wavelength of 635 nm and a second laser beam light source 12A that emits a second laser beam L2A with a wavelength of 470 nm. The optical pickup device 1A reproduces and records data on optical recording media 6 of different types, in which the first laser beam L1A with a longer wavelength of 635 nm may be used to record data on DVD-RAMs and DVD-Rs, and the second laser beam L2A with a shorter wavelength of 470 nm may be used to reproduce data on super high density discs.

A common optical system LoA includes a step-like diffraction element 20A that straightly advances the first laser beam L1A emitted from the two-wavelength light source 10A and deflects the second laser beam L2A to match optical axes of the both beams. The step-like diffraction element 20A will be described later in greater detail.

A first objective lens 41a for the first laser beam L1A and a second objective lens 41b for the second laser beam L2A are disposed in a switchable manner to converge the laser beams L1A and L2A emitted from the collimator lens 40 on a recording surface 6a of the optical medium 6.

(Step-Like Diffraction Element)

Description will be made with respect to the step-like diffraction element 20A that straightly advances the first laser beam L1A emitted from the two-wavelength light source 10A and deflects the second laser beam L2A to match optical axes of the both beams.

Figure 6:
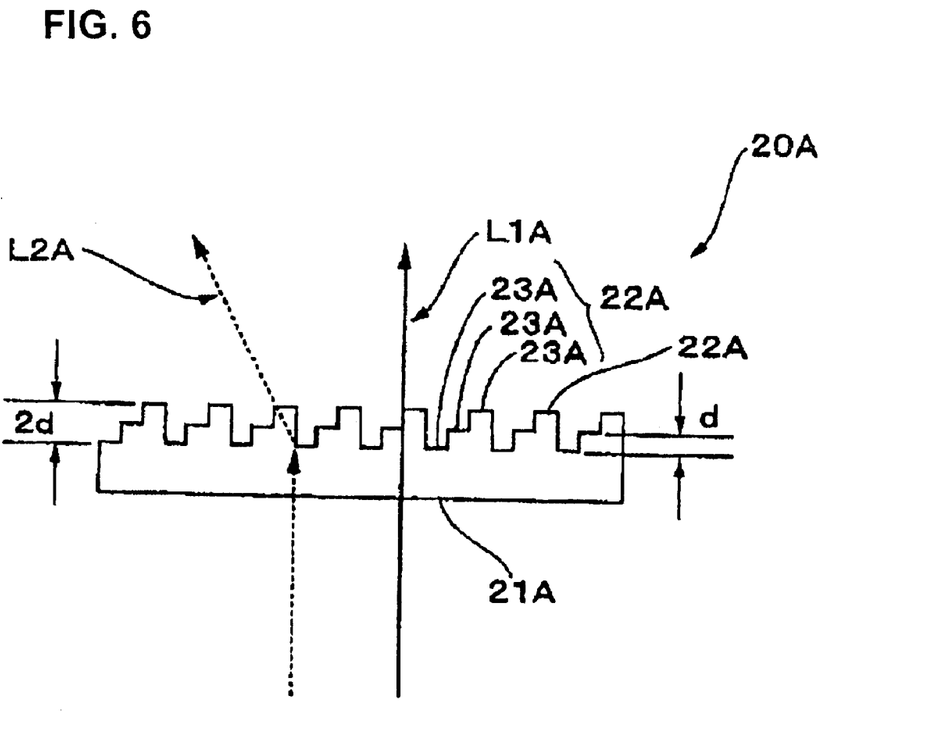
FIG. 6 is a cross-sectional view of a step-like diffraction element to be used in the optical pickup device shown in FIG. 5.
Figure 7:
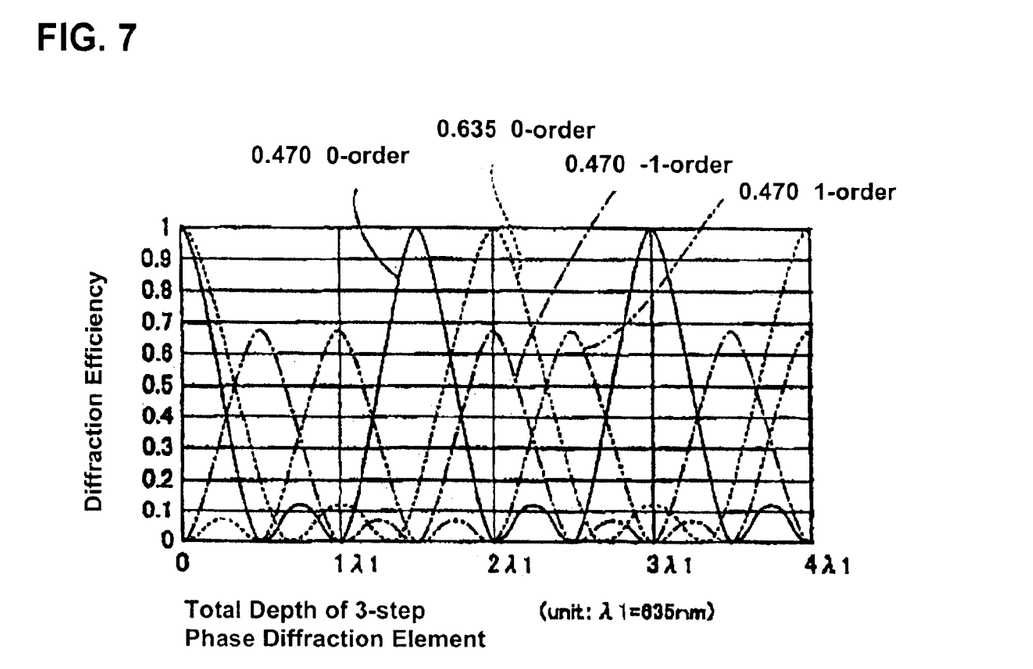
FIG. 7 is a graph showing relations between grating depths of the step-like diffraction element shown in FIG. 6 and diffraction efficiency.

FIG. 6 is a cross-sectional view of the step-like diffraction element 20A to be used in the optical pickup device 1A shown in FIG. 5. FIG. 7 is a graph showing relations between grating depths of the step-like diffraction element shown in FIG. 6 and the diffraction efficiency.

The step-like diffraction element 20A of the present embodiment is formed from a flat plate that is transparent to the wavelengths used, in which one of the faces defines a flat incident face 21A and the other face defines an emission face 22A having a step-like surface. The step-like surface has periodically formed sets of steps or stairs, each of which is composed of three step faces 23A.

A step difference d of the step faces 23A is set to have a measurement that generates a phase difference of $2\pi$, in other words a light-path difference corresponding to one wavelength when the first laser beam L1A with a long wavelength of 635 nm transmits the step-like diffraction element 20A. Accordingly, the step-like diffraction element 20A straightly advances the first laser beam L1A and deflects the second laser beam L2A.

Also in this embodiment, when the wavelength of one of the first and second laser beams L1 and L2 on the long wavelength side is $\lambda 1$, and the wavelength of the other laser beam on the short wavelength side is $\lambda 2$, the number of step faces 23A, which is "3", is obtained as an integer that is closest to a that satisfies the expression (4). In the present embodiment, the long wavelength $\lambda 1$ is 635 nm, and the short wavelength $\lambda 2$ is 470 nm, and therefore the expression (4) is modified to the following expression (11).

$$\lambda 2/\lambda 1 = 470/635 = \alpha/(\alpha+1) \qquad (11)$$

Therefore, the value $\alpha=2.849\ldots$, and an integer that is closest to the value $\alpha$, which is "3", is obtained.

The diffraction efficiency of the step-like diffraction element 20A with the three step faces 23A may be given by the following expressions (12) and (13), when the zero-order diffraction efficiency is Fo and M order diffraction efficiency is Fm.

$$Fo = 1/3^2 \{2 \cos(d\pi) + +1\}^2 \qquad (12)$$

$$Fm = 1/(\pi m)^2 [\sin\{\pi(dm)\} - \sin\{\pi(d+1/3m)\} + \sin\{\pi(1/3m)\}]^2 \qquad (13)$$

In the expressions, d is a height of one step, and m is an order number of diffraction (which is an integer but $m \neq 0$). Relations between the grating depths and the diffraction efficiency with the long wavelength $\lambda 1=635$ nm and the short wavelength $\lambda 2=470$ nm, which are derived from the expressions (12) and (13) are shown in a graph in FIG. 7. The grating depths are expressed by multiples of $\lambda 1$ that represents the long wavelength of 635 nm.

As shown in the figure, when the total depth of the three step faces, in other words, the value of 2d, is changed from zero (0) to $4\lambda 1$, no phase difference occurs for the long wavelength $\lambda 1=635$ nm at $2\lambda 1$ because the step difference d corresponds to one wavelength, and the zero-order diffraction efficiency becomes to be "1", and the (−) first-order diffraction efficiency for the short wavelength $\lambda 2=470$ nm becomes to be 0.68, in other words, both of the diffraction efficiencies reach their respective maximum values.

Accordingly, the number of steps obtained by expression (4), which is 3, maximizes the zero-order diffraction efficiency of the long wavelength $\lambda 1=635$ nm and the (−) first-order diffraction efficiency of the short wavelength $\lambda 2=470$ nm.

Also, the collimator lens 40 generally satisfies the sine condition, and therefore, when an image height is h, and the focal position of the long wavelength 635 nm of the collimator lens 40 is $F_{635}$, a focal position $\Delta Z$ in the optical axis direction is given by the following expression (14).

$$\Delta Z \cong F_{635} - \sqrt{(F_{635}^2 - h^2)} \qquad (14)$$

When a refractive index of the collimator lens 40 that is manufactured with a material having a single uniform refractive index against the laser beam with a wavelength of 470 nm is $N_{470}$, and a refractive index thereof against the laser beam with a wavelength of 635 nm is $N_{635}$, a color aberration $\Delta Fc$ can be given by the following expression (15).

$$\Delta Fc = F_{635} - F_{635} N_{470}/N_{635} \qquad (15)$$

A focus deviation $\Delta F$, which is caused by a positional difference (a height) in a vertical direction with respect to the optical axis of the laser beams emitted from the two different laser beam light sources can be given by adding the expressions (14) and (15) as indicated in the following expression (16).

$$\Delta F = \Delta Z + \Delta Fc \cong F_{635} - \sqrt{(F_{635}^2 - h^2)} + F_{635} - F_{635} N_{470}/N_{635} \qquad (16)$$

This focus deviation $\Delta F$ can be corrected similarly as described in the first embodiment by forming the step-like step surfaces 23A on the emitting face 22A of the step-like diffraction element 20A in concentric curves, as indicated in FIG. 4.

[Another Example of First Embodiment]

The step-like diffraction element 20 in the optical pickup device 1 of the first embodiment straightly advances the first laser beam L1 with a long wavelength of 780 nm, and deflects the second laser beam L2 with a short wavelength of 650 nm to match the optical axes of the laser beams. However, the step-like diffraction element 20 can be structured such that the laser beam L1 with a long wavelength may be deflected, and the laser beam L2 with a short wavelength may travel straight path through the step-like diffraction element 20 to mach the optical axes of the laser beams. The following description will be made with the wavelength λ1 of the first laser beam L1 on the long wavelength side being 785 nm and the wavelength λ2 of the second laser beam L2 on the short wavelength side being 635 nm.

Figure 8:
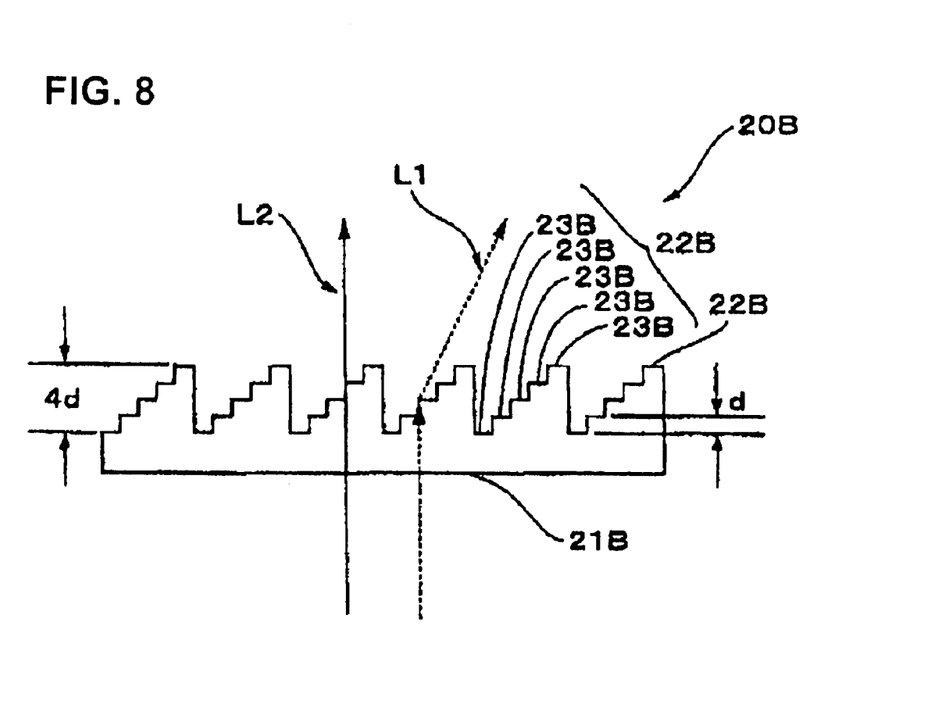
FIG. 8 is a cross-sectional view of a step-like diffraction element to be used in the optical pickup device shown in FIG. 1.
Figure 9:
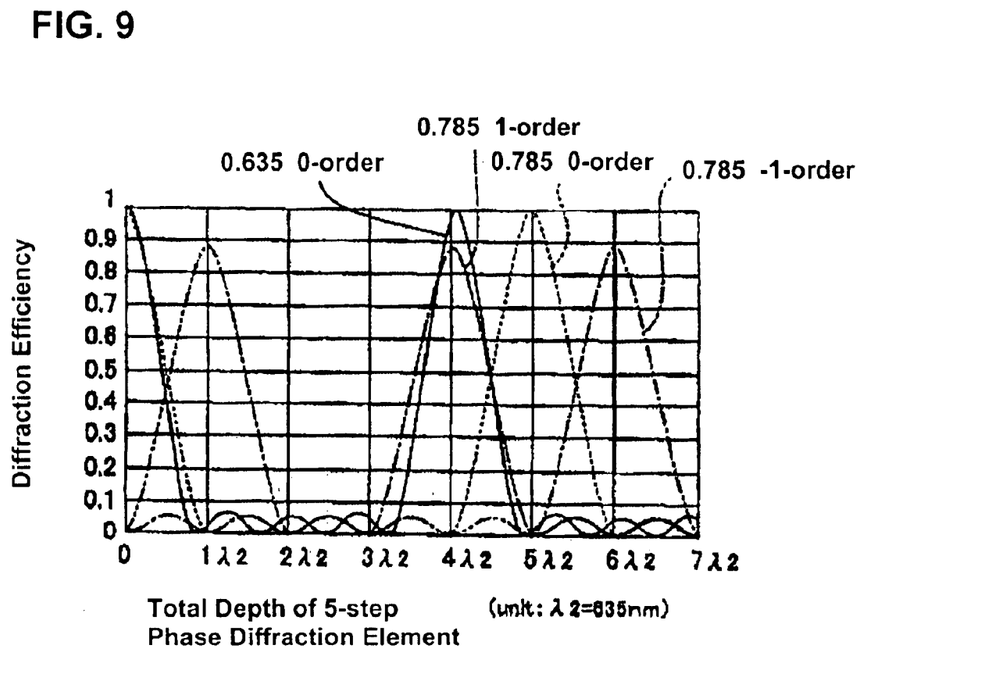
FIG. 9 is a graph showing relations between grating depths of the step-like diffraction element shown in FIG. 8 and the diffraction efficiency.

FIG. 8 is a cross-sectional view of a step-like diffraction element in this embodiment. FIG. 9 is a graph showing relations between grating depths of the step-like diffraction element shown in FIG. 8 and the diffraction efficiency.

The step-like diffraction element 20B in this embodiment deflects the first laser beam L1 with a wavelength of 780 nm, and straightly advances the second laser beam L2 with a wavelength of 635 nm to match the optical axes of the laser beams. The step-like diffraction element 20B is formed from a flat plate that is transparent to the wavelengths used, in which one of the faces defines a flat incident face 21B and the other face defines an emission face 22B having a step-like surface. The step-like surface 22B has periodically formed sets of steps or stairs, each of which is composed of five step faces 23B.

The five step faces 23B are set such that a step difference d thereof is set to have a measurement that generates a phase difference of $2\pi$, in other words a light-path difference corresponding to one wavelength when the second laser beam L2 with a short wavelength of 635 nm transmits the step-like diffraction element 20B. Accordingly, the step-like diffraction element 20B deflects the first laser beam L1 and straightly advances the second laser beam L2, to thereby match the optical axes of the laser beams.

Unlike the first and second embodiments, the number of step faces 23B is decided in a different manner in this embodiment as follows. When the wavelength on the long wavelength side among the first and second laser beams L1 and L2 is λ1, and the wavelength on the short wavelength side is λ2, the number of steps is set to a value in which one "1" is added to a value α that satisfies the expression (4). When the long wavelength λ1 is 785 nm, and the short wavelength λ2 is 635 nm, the expression (4) can be represented by the following expression (17).

$$\lambda 2/\lambda 1 = 635/785 = \alpha/(\alpha+1) \tag{17}$$

Therefore, since the value α=4.235... is derived from the expression (17), an integer that is closest to the value α is "4", and therefore the number of steps, which is 5(=α+1), is obtained.

The diffraction efficiency of the step-like diffraction element 20B with the five steps thus configured may be given by the expressions (6) and (7) similarly as given in the first embodiment, with the zero-order diffraction efficiency being Fo and M order diffraction efficiency being Fm. Relations between the grating depths and the diffraction efficiency with the long wavelength λ1=785 nm and the short wavelength λ2=635 nm, which are derived from the expressions (6) and (7) are shown in a graph in FIG. 9. The grating depths are expressed by multiples of λ2 that represents the short wavelength of 635 nm.

As shown in the figure, when the total depth of the five steps of the step-like diffraction element, in other words, the value of 4d, is changed from zero (0) to 7λ2, no phase difference occurs for the short wavelength λ2=635 nm at 4λ2 because the step difference d corresponds to one wavelength, and the zero-order diffraction efficiency becomes to be one "1", and the (+) first-order diffraction efficiency for the long wavelength λ1=785 nm becomes to be 0.86, in other words, both of the diffraction efficiencies reach their respective maximum values. Accordingly, the number of steps obtained by expression (4), which is 5, maximizes the (+) first-order diffraction efficiency of the long wavelength λ1=785 nm and the zero-order diffraction efficiency of the short wavelength λ2=635 nm.

When the step-like diffraction element 20B is formed to have the number of steps that does not satisfy expression (4), in other words, the number of steps other than 5, the maximum value of the (+) first-order diffraction efficiency of the long wavelength does not coincide with the maximum value of the zero-order diffraction efficiency of the short wavelength, even when one wavelength of the short wavelength is made equal to the height of one step.

With the image height characteristic of the collimator lens 40, when an image height is h, and the focal position of the short wavelength of 635 nm of the collimator lens 40 is $F_{635}$, a focal position ΔZ in the optical axis direction is given by the following expression (18).

$$\Delta Z \cong F_{635} - \sqrt{(F_{635}^2 - h^2)} \tag{18}$$

When a refractive index of the collimator lens 40 that is manufactured with a material having a single uniform refractive index against the laser beam with a wavelength of 635 nm is $N_{635}$, and a refractive index thereof against the laser beam with a wavelength of 785 nm is $N_{785}$, the amount of chromatic aberration ΔFc can be given by the following expression (19)

$$\Delta Fc = F_{635} - F_{635} N_{785}/N_{635} \tag{19}$$

A focus deviation ΔF, which is caused by a positional difference (a height) in a vertical direction with respect to the optical axis of the laser beams emitted from the two different laser beam light sources can be given by adding the expressions (18) and (19) as indicated in the following expression (20).

$$\Delta F = \Delta Z + \Delta Fc \cong F_{635} - \sqrt{(F_{635}^2 - h^2)} + F_{635} - F_{635} N_{785}/N_{635} \tag{20}$$

This focus deviation ΔF can be corrected by forming the step-like step surfaces 23B on the emitting face 22B of the step-like diffraction element 20B in concentric curves, as indicated in FIG. 4, in a similar manner as done in the first embodiment.

With the optical pickup device equipped with the step-like diffraction element 20B, in any of the occasions when the first laser beam L1 with a long wavelength is used to reproduce data on a CD-R, and when the second laser beam L1 with a short wavelength is used to reproduce and record data on a CVD, DVD-RAM or DVD-R, the utilization efficiency of the laser beams can be raised to their maximum values.

(Another Example of Second Embodiment)

Similarly, the step-like diffraction element 20A in the optical pickup device 1A of the second embodiment straightly advances the first laser beam L1 with a long wavelength of 635 nm, and deflects the second laser beam L2 with a short wavelength of 470 nm to match the optical axes of the laser beams. However, the step-like diffraction element 20A can be structured such that the laser beam L1 with a long wavelength may be deflected, and the laser beam L2 with a short wavelength may be straightly advanced through the step-like diffraction element 20A to mach the optical axes of the laser beams.

Figure 10:
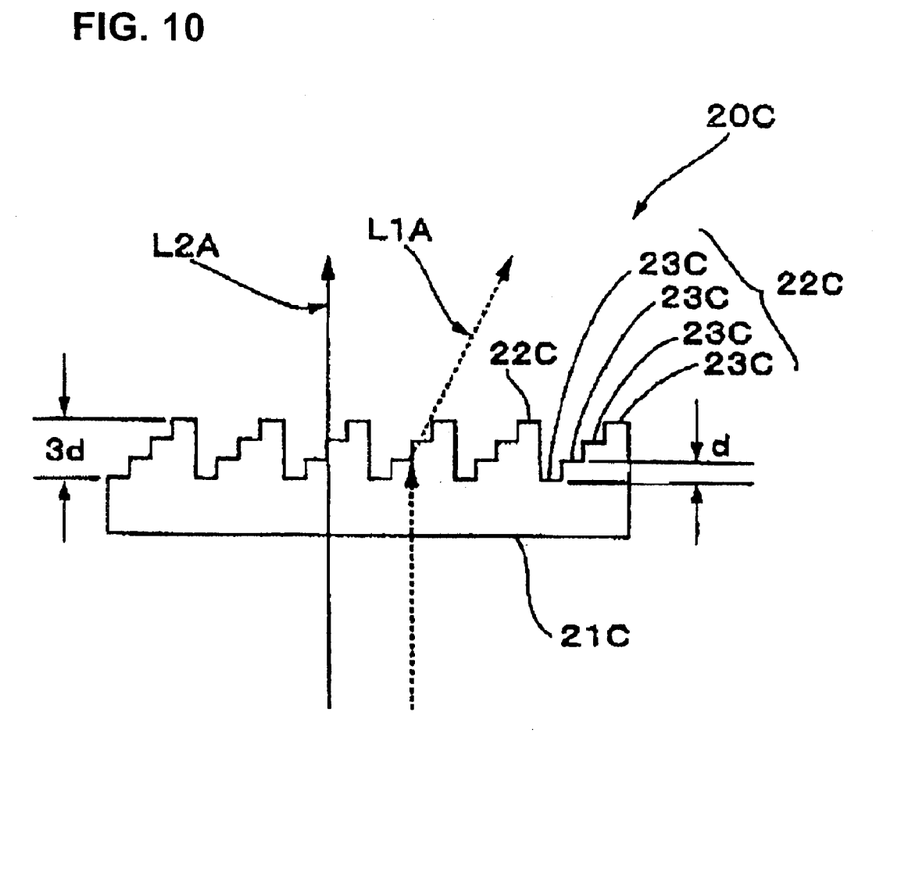
FIG. 10 is a cross-sectional view of a step-like diffraction element of another example to be used in the optical pickup device shown in FIG. 5.

FIG. 10 is a cross-sectional view of a step-like diffraction element 20C of another example to be used in the optical pickup device 1A shown in FIG. 5.

The step-like diffraction element 20C in this embodiment deflects the first laser beam L1A with a wavelength of 635 nm, and straightly advances the second laser beam L2A with a wavelength of 470 nm to match the optical axes of the laser beams. The step-like diffraction element 20C is formed from a flat plate that is transparent to lights that are used, in which one of the faces defines a flat incident face 21C and the other face defines an emission face 22C having a step-like surface. The step-like surface 22C has periodically formed sets of steps or stairs, each of which is composed of four step faces 23C.

The four step faces 23C are set such that a step difference d thereof is set to generate a phase difference of $2\pi$, in other words a light-path difference corresponding to one wavelength when the second laser beam L2A with a wavelength of 470 nm transmits the step-like diffraction element 20C. Accordingly, the step-like diffraction element 20C deflects the first laser beam L1A and straightly advances the second laser beam L2, to thereby match the optical axes of the laser beams.

When the wavelength on the long wavelength side among the first and second laser beams L1A and L2A is $\lambda 1$, and the wavelength on the short wavelength side is $\lambda 2$, the number of steps is set to be "4". Namely, since the value $\alpha=2.857$ . . . is derived from the expression (4), an integer that is closest to the value $\alpha$ is "3", and therefore the number of steps, which is 4 ($=\alpha+1$), is obtained.

With the optical pickup device equipped with the four-step step-like diffraction element 20C, the (+) first-order diffraction efficiency of the first laser beam L1A with a wavelength of 635 nm is 0.81, and the zero-order diffraction efficiency of the laser beam L2A with a wavelength of 470 nm is "1".

(Other Embodiments)

In the examples described above, a step-like diffraction element is disposed in an optical path that starts from a first laser beam light source and a second laser beam light source, and reaches an objective lens in a common optical system, in other words, a forward path in the optical system. Instead, the step-like diffraction element may be disposed in a returning path of the optical system that reaches from an objective lens to a light receiving element, for example, between a beam splitter in the common optical system and the common light-receiving element.

In this case, returning lights of the first and second laser beams, which are conducted through the common optical system with their optical axes being deviated, can be adjusted to match their optical axes by the step-like diffraction element and received by the common light receiving element.

As describe above, a two-wavelength optical pickup device in accordance with the present invention uses a step-like diffraction element as a phase diffraction element that is used to match optical axes of lights with different wavelengths, and the number of steps in the step-like diffraction element is set to maximize the utility efficiency of both of the laser beams. Accordingly, the lights having different wavelengths emitted from different light sources can be conducted to a common optical system through the step-like diffraction element in a state with a few light loss amount. In this manner, in accordance with the present invention, the utility efficiency of emitted lights can be increased, and therefore the power output of the light sources can be reduced, and a lower power consumption of the device can be realized.

While the description above refers to particular embodiments of the present invention, it will be understood that many modifications may be made without departing from the spirit thereof The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical pickup device comprising:

a first light source that emits first light;

a second light source that emits second light with a wavelength different from a wavelength of the first light; and a step-like diffraction element that deflects one of the first light and the second light to match optical axes of the first light and the second light, the step-like diffraction element defining a light incident face and a light emitting face, one of the incident face and the emitting face having multiple sets of step-like grating faces, wherein, when a wavelength $\lambda 1$ of the first light is longer than a wavelength $\lambda 2$ of the second light, a step difference between adjacent ones of the step-like grating faces has a measurement that generates a phase difference corresponding to one wavelength for the first light, and the number of steps of each of the multiple sets of step like grating faces is set at an integer that is closest to a value $\alpha$ that satisfies an expression of $\lambda 2/\lambda 1 = \alpha/(\alpha+1)$.

2. An optical pickup device according to claim 1, wherein, when the wavelength $\lambda 1$ of the first light is about 785 nm, and the wavelength $\lambda 2$ of the second light is about 650 nm, the number of steps of each of the multiple sets of step-like grating faces is five.

3. An optical pickup device according to claim 1, wherein, when the wavelength $\lambda 1$ of the first light is about 635 nm, and the wavelength $\lambda 2$ of the second light is about 470 nm, the number of steps of each of the multiple sets of step-like grating faces is three.

4. An optical pickup device comprising:

a first light source that emits first light;

a second light source that emits second light having a wavelength different from a wavelength of the first light; and a step-like diffraction element that deflects one of the first light and the second light to match optical axes of the first light and the second light, the step-like diffraction element defining a light incident face and a light emitting face, one of the light incident face and the light emitting face having multiple sets of step-like grating faces, wherein, when a wavelength $\lambda 1$ of the first light is longer than a wavelength $\lambda 2$ of the second light, a step difference between adjacent ones of the step-like grating faces of each of the multiple sets of step-like grating faces has a measurement that generates a phase difference corresponding to one wavelength for the second light, and the number of steps of each of the multiple sets of step like grating faces is set at a value in which one is added to an integer that is closest to a value α that satisfies an expression of $\lambda 2/\lambda 1=\alpha/(\alpha+1)$.

5. An optical pickup device according to claim 4, wherein, when the wavelength λ 1 of the first light is about 785 nm, and the wavelength λ 2 of the second light is about 635 nm, the number of steps of each of the multiple sets of step-like grating faces is five.

6. An optical pickup device according to claim 4, wherein, when the wavelength λ 1 of the first light is about 635 nm, and the wavelength λ 2 of the second light is about 470 nm, the number of steps of each of the multiple sets of step-like grating faces is four.

7. A method for designing an optical pickup device comprising a first light source that emits first light, a second light source that emits second light having a wavelength different from a wavelength of the first light, and a step-like diffraction element that deflects one of the first light and the second light to match optical axes of the first light and the second light, the step like diffraction element defining a light incident face and a light emitting face, one of the light incident face and the light emitting face having multiple sets of step-like grating faces, the method comprising the steps of:

when a wavelength λ 1 of the first light is longer than a wavelength λ 2 of the second light, setting a step difference between adjacent ones of the step-like grating faces to have a measurement that generates a phase difference corresponding to one wavelength for the first light; and setting the number of steps of each of the multiple sets of step-like grating faces to be at an integer that is closest to a value α that satisfies an expression of $\lambda 2/\lambda 1=\alpha/(\alpha+1)$.

8. A method for designing an optical pickup device comprising a first light source that emits first light, a second light source that emits second light having a wavelength different from a wavelength of the first light, and a step-like diffraction element that deflects one of the first light and the second light to match optical axes of the first light and the second light, the step-like diffraction element defining a light incident face and a light emitting face, one of the light incident face and the light emitting face having multiple sets of step-like grating faces, the method comprising the steps of:

when a wavelength λ 1 of the first light is longer than a wavelength λ 2 of the second light, setting a step difference between adjacent ones of the step-like grating faces of each of the multiple sets of step-like grating faces to have a measurement that generates a phase difference corresponding to one wavelength for the second light; and setting the number of steps of each of the multiple sets of step-like grating faces to be at a value in which one is added to an integer that is closest to a value α that satisfies an expression of $\lambda 2/\lambda 1=\alpha/(\alpha+1)$.

* * * * *